July 10, 1923.
C. S. ALLEN
TRACTOR
Filed Aug. 26, 1921
1,461,642
5 Sheets—Sheet 1
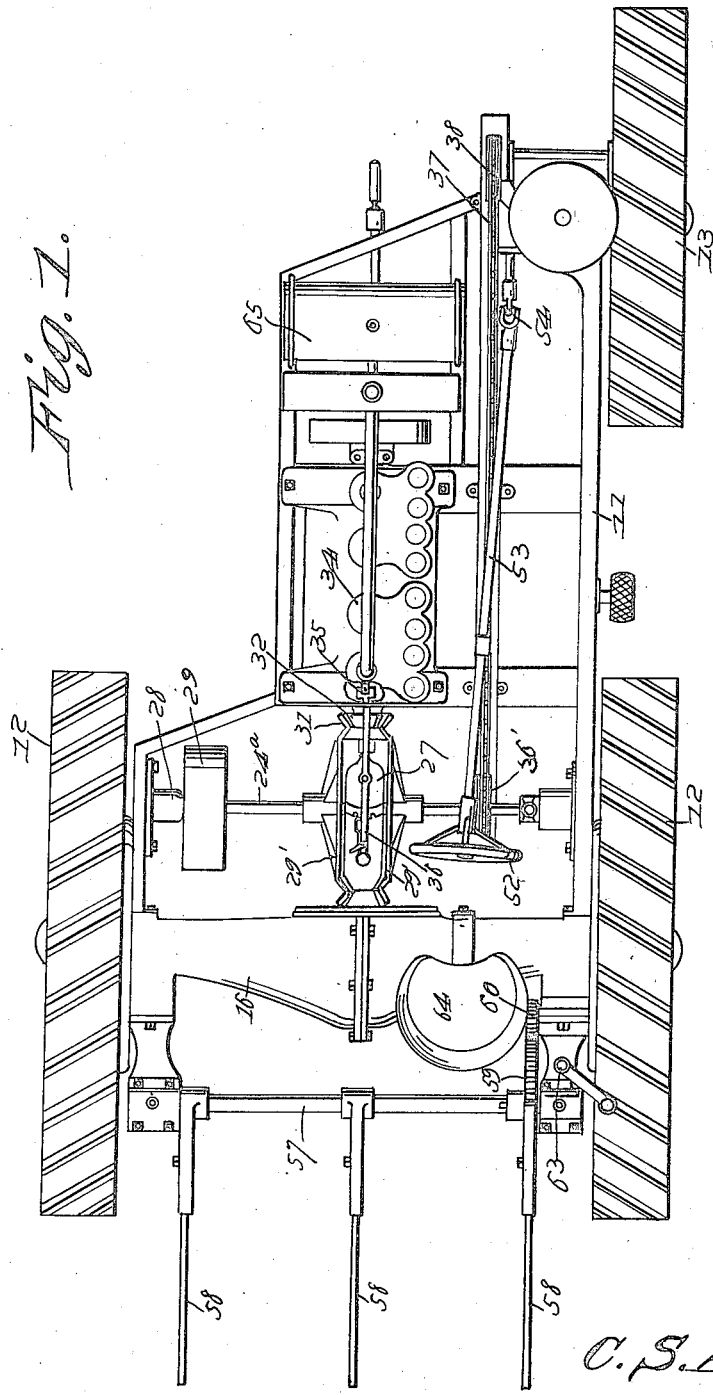
Inventor
C. S. Allen,
By
Attorney

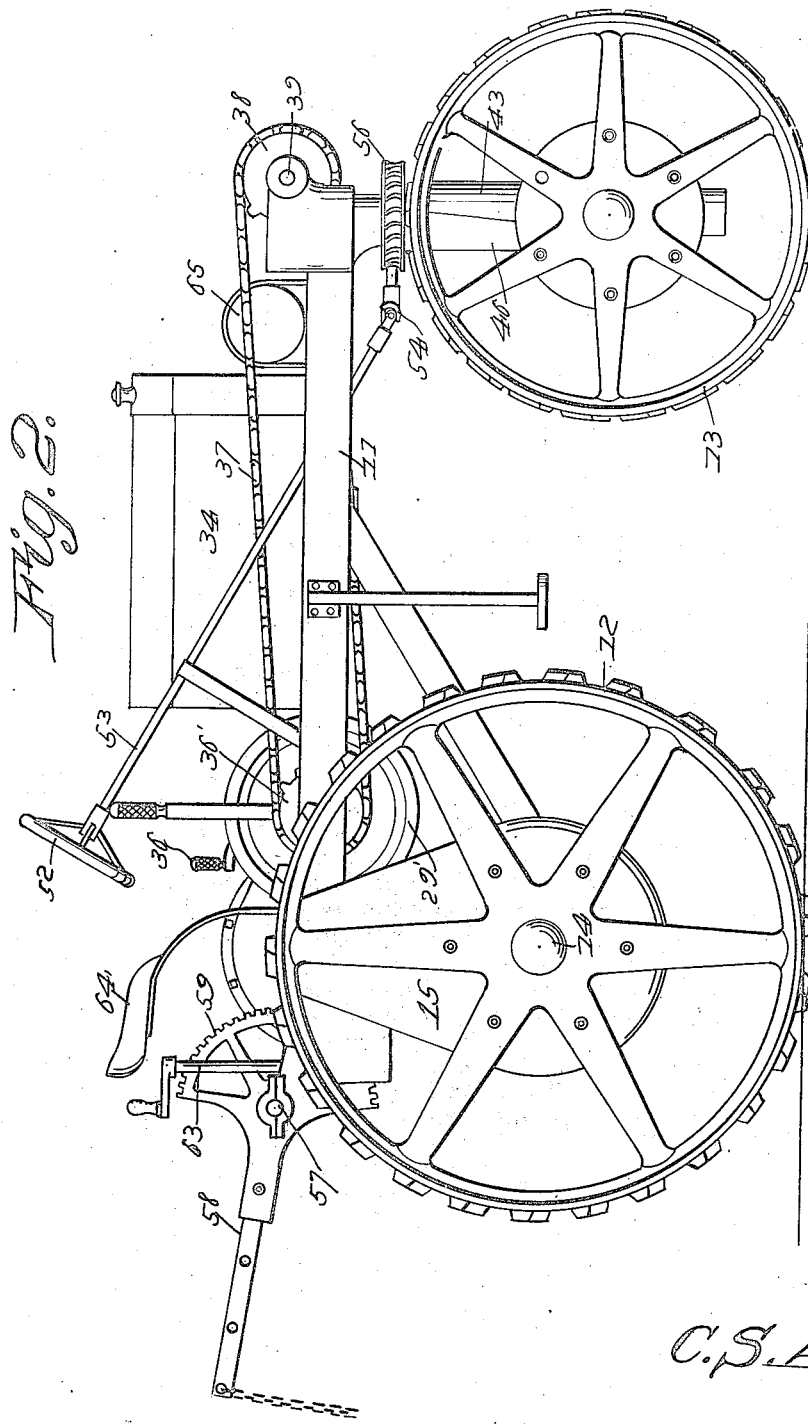

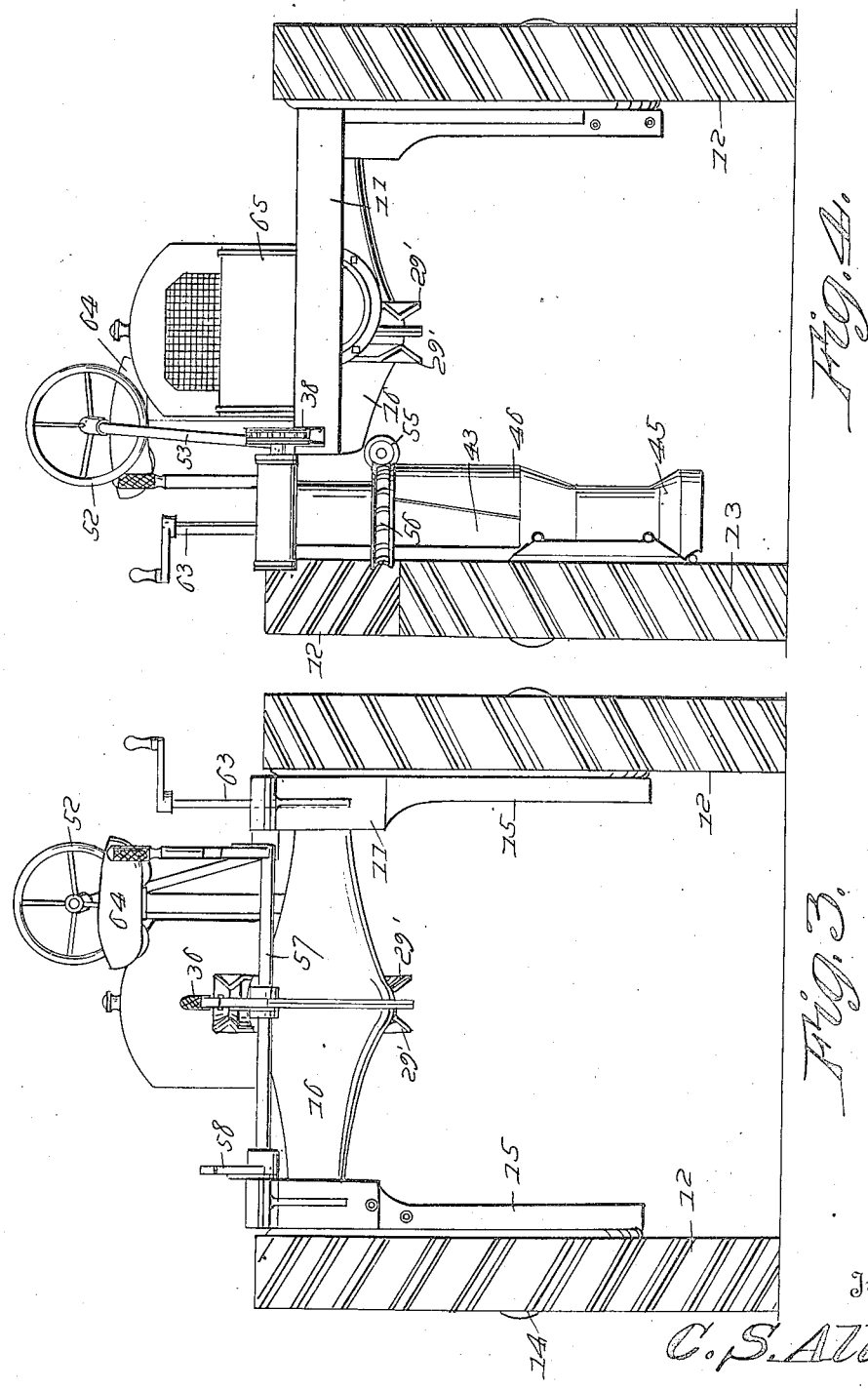

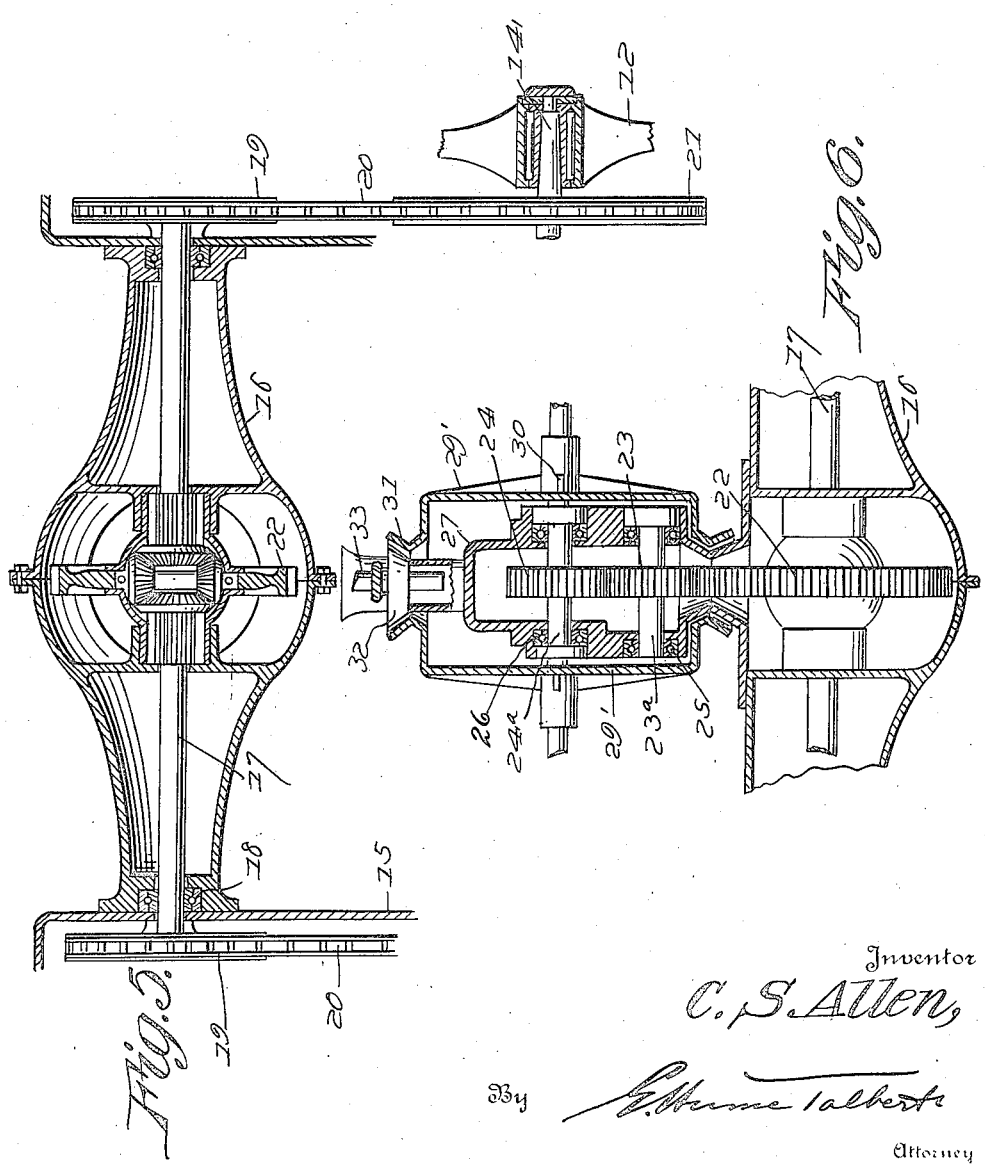

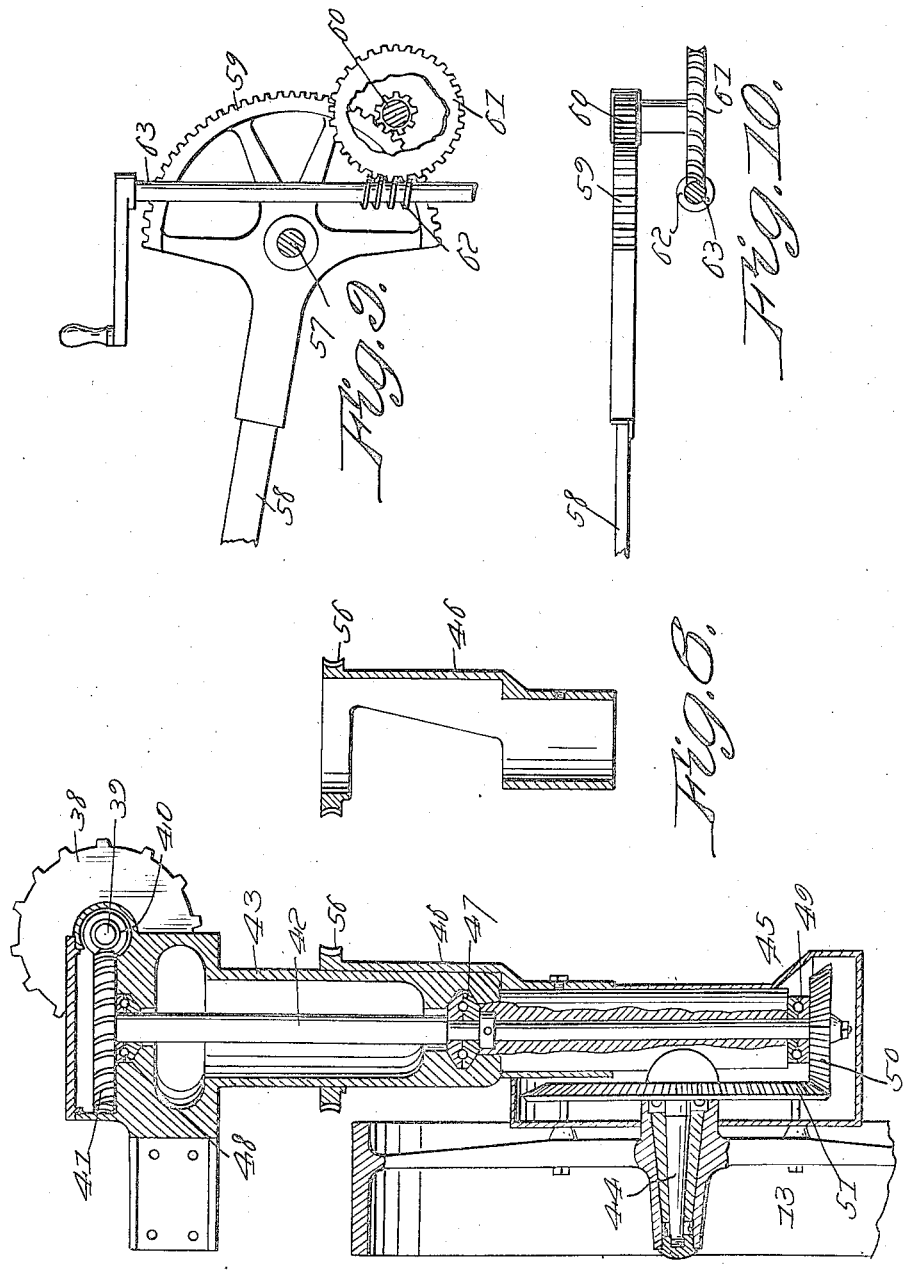

Patented July 10, 1923.

1,461,642

UNITED STATES PATENT OFFICE.

CHARLES SIDNEY ALLEN, OF DAWSON, GEORGIA.

TRACTOR.

Application filed August 26, 1921. Serial No. 495,667.

*To all whom it may concern:*

Be it known that CHARLES SIDNEY ALLEN, a citizen of the United States of America, residing at Dawson, in the county of Terrell and State of Georgia, has invented new and useful Improvements in Tractors, of which the following is a specification.

The object of the invention is to provide a tractor and power generating plant combined, the specific purpose in view being to provide a tractor construction adapting it for general farm use in cultivating as well as in the preparation of the soil for planting, and under conditions adapting it to be operated adjacent to growing plants; and particularly to provide a mechanism for the purpose indicated which can be operated with the minimum expenditure or consumption of fuel and with the maximum of power in proportion to the fuel expended, by affording communication of driving energy to all of the supporting wheels including the front or steering wheel; and furthermore to consolidate and simplify the construction and arrangement of the power transmission mechanism to adapt it for the purposes indicated under conditions wherein the moving parts are fully protected against accumulations of dust and contact with adjacent objects and may be caused to run in oil as a means of minimizing the friction and wear on the elements thereof; and with these objects in view the invention consists in a construction and combination of parts of which a preferred embodiment is shown in the accompanying drawings; wherein:—

Figure 1 is a plan view of a tractor embodying the invention.

Figure 2 is a side view of the same.

Figures 3 and 4 are respectively rear and front views thereof.

Figure 5 is a transverse section taken in the plane of the differential gear and the rear driving wheels.

Figure 6 is a horizontal section in detail of the transmission gear and the adjacent portion of the differential gear.

Figure 7 is a vertical sectional view in detail of the means for mounting and transmitting motion to the front or steering wheel.

Figure 8 is a detail view in section of the steering sleeve.

Figure 9 is a detail view of the means for controlling the furrow depth of a trailing plow or cultivator or the movement to working or transport position of a trailing land working implement.

Figure 10 is a plan view of the mechanism shown in Figure 9.

The mechanism is organized with a view to adapting the tractor to be used as a means of operating cultivator implements or machines without injury to growing plants or crops in rows or stands, and to this end the frame 11 thereof is arranged at an elevation approximating that of the diameters of the main ground or drive wheels 12 and the front or steering wheel 13 which may as illustrated be of smaller diameter and as hereinafter explained is adapted to be driven by the motor to add to the tractive power of the machine is arranged in the vertical longitudinal plane of one of the main drive wheels so as to be accurately tracked thereby to afford a generally transverse arched construction of tractor adapting it to be operated in straddling relation with the row or rows of plants or crops as will be obvious by reference to Figures 3 and 4 of the drawings taken in connection with Figure 1.

The main drive or rear wheels 12 are carried by spindles 14 mounted in bearings in housings 15 depending from the main frame adjacent to the planes of the wheels and connected at their upper ends by a differential casing 16, with the drive shaft 17 of the differential gear extended through suitable antifriction bearings 18 into the housings 15 and fitted with sprocket wheels 18 connected by chains 20 with sprocket wheels 21 secured to the spindles 14 and also enclosed within the housings so as to be entirely protected from dust and adjacent objects and permit of the running of the sprocket wheels and chains in oil to minimize the friction in operation.

A typical or conventional form of differential gear is shown and may be employed in this connection with its main gear member 22 in mesh with a counter-gear 23 actuated by a drive gear 24, said counter and drive gears being provided with shafts 23ᵃ and 24ᵃ mounted in suitable anti-friction bearings 25 and 26 in a gear casing or housing 27 supported at one end by the differential gear casing 16. The drive shaft 24ᵃ which is terminally mounted in bearings 28 on the main frame and may carry a fly wheel or pulley 29 by which motion may be communicated to other machinery to be driven, and also carries friction disks 29', keyed to said shaft as indicated at 30, and between the peripheries of said friction disks, of which the bearing surfaces are conical as indicated at 31, is a conical friction pulley 32 carried by the motor shaft 33 driven by the motor indicated at 34 and which may be of the explosion or any other type. The motor shaft is preferably provided with a universal joint 35 permitting of the movement of the friction pulley through the agency of an operating lever 36 to arrange it in contact selectively with the bearing surfaces of the friction disks for imparting either forward or reverse rotary motion to the drive shaft 24ᵃ and thence through the differential gear to the rear drive wheels.

The drive shaft 24ᵃ also is provided with a sprocket wheel 36 connected by a chain 37 with the sprocket wheel 38 of which the shaft 39 carries a worm 40 meshing with a worm gear 41 at the upper end of an upright spindle 42 mounted in a housing 43 adjacent to the front or steering wheel 13, said steering wheel being carried by a spindle 44 mounted in a boxing 45 having a swivel connection with the housing 43 through a steering wheel 46 revolubly mounted on the housing 43 and serving as a support for the boxing 45. The shaft 42 is provided with an intermediate anti-friction bearing 47 and terminal anti-friction bearings 48 and 49 and carries at its lower end a gear 50 meshing with a gear 51 on the steering wheel spindle 44 so that the motion of the drive shaft 24ᵃ is communicated through the chain gear and the worm gear to the shaft 42 and thence through the gearing 50—51 to the spindle of the steering wheel.

The steering of the machine is accomplished by means of a hand wheel 52 of which the post 53 having a suitable flexible joint 54 carries a worm 55 meshing with a worm gear 56 on the steering sleeve 46.

As a means of raising and lowering a trailing cultivating implement or plow there is employed a rock shaft 57 provided with rearwardly extending arms 58 and carrying a segment 59 with which meshes a pinion 60 carried by a worm gear 61 actuated by a worm 62 on a hand operable spindle 63 within convenient reach of the operator occupying the seat 64 adjacent to the hand wheel 52 of the steering mechanism.

In carrying out the object hereinbefore indicated the motor as will be noted is mounted on the main frame and above the plane thereof and the gas tank 65 is arranged adjacent to and in advance thereof as clearly indicated in Figures 1 and 2.

Having described the invention, what is claimed as new and useful is:—

1. A tractor having power actuable driving and steering wheels, an elevated frame provided with depending side housings in which the spindles of the driving wheels are journaled to adapt the machine to operate in straddling relation with a row of plants, a motor carried by the frame, a differential axle carried by the frame and having operative connections with the driving wheels consisting of chains and sprockets housed in said depending side housings, a transmission mechanism interposed between the motor and the differential axle, and operative connections between the transmission mechanism and the steering wheel.

2. A tractor having power actuable driving and steering wheels supporting an elevated frame provided with depending side housings for carrying the wheel spindles, to adapt the machine to operate in straddling relation with a row of plants, a differential gear having its drive shaft connected with the drive wheel spindles by chain gears and a transmission gear provided with friction disks and a motor driven friction pulley for selective engagement with said friction disks.

3. A tractor having power actuable driving and steering wheels supporting an elevated frame provided with depending side housings for carrying the wheel spindles, to adapt the machine to operate in straddling relation with a row of plants, a differential gear having its drive shaft connected with the drive wheel spindles by chain gears and a transmission gear provided with friction disks and a motor driven friction pulley for selective engagement with said friction disks, the bearing surfaces of said friction disk and pulley being of conical construction.

4. A tractor having power actuable driving and steering wheels supporting an elevated frame provided with depending side housings for carrying the wheel spindles, to adapt the machine to operate in straddling relation with a row of plants, a differential gear arranged in the plane of the frame and having its drive shaft connected with the drive wheel spindles by chain gears arranged in said housings, and a transmission gear also arranged substantially in the plane of the main frame and having a counter-gear meshing with the main gear of the differential, said transmission gear having cone faced friction disks fixed to the drive shaft and a motor driven cone faced friction pulley selectively engageable with said disks.

5. A tractor having power actuable driving and steering wheels supporting an elevated frame provided with depending side housings for carrying the wheel spindles, to adapt the machine to operate in straddling relation with a row of plants, the housing for the front steering wheel having a swivelled extension or boxing carrying the steering wheel spindle, a steering sleeve mounted upon the said housing and attached to the boxing, and steering mechanism including a hand wheel and a post, a worm carried by the post and a worm gear carried by said steering sleeve.

6. A tractor having power actuable driving and steering wheels supporting an elevated frame provided with depending side housings for carrying the wheel spindles, to adapt the machine to operate in straddling relation with a row of plants, the steering wheel housing having a swivelled extension forming a boxing for supporting the steering wheel spindle, steering means operatively connected with the boxing, and a motor actuated shaft mounted in said housing and geared to said spindle.

In testimony whereof he affixes his signature.

CHARLES SIDNEY ALLEN.